(12) United States Patent
Zilka

(10) Patent No.: US 7,330,715 B1
(45) Date of Patent: Feb. 12, 2008

(54) SYSTEM, METHOD, AND COMPUTER PROGRAM PRODUCT FOR TRANSFERRING CONTACT INFORMATION USING A CELLULAR PHONE

(76) Inventor: Kevin J. Zilka, 1067 Laurie Ave., San Jose, CA (US) 95125

( * ) Notice: Subject to any disclaimer, the term of this patent is extended or adjusted under 35 U.S.C. 154(b) by 309 days.

(21) Appl. No.: 11/253,237

(22) Filed: Oct. 18, 2005

Related U.S. Application Data

(60) Provisional application No. 60/620,239, filed on Oct. 18, 2004.

(51) Int. Cl.
*H04M 1/663* (2006.01)

(52) U.S. Cl. .................. 455/412.2; 455/414.1; 455/404; 455/415; 455/412.1

(58) Field of Classification Search ............. 455/412.1, 455/414.1, 404, 412.2
See application file for complete search history.

(56) References Cited

U.S. PATENT DOCUMENTS

| | | | |
|---|---|---|---|
| 2002/0137489 A1* | 9/2002 | Dutta et al. ................. | 455/404 |
| 2004/0203622 A1* | 10/2004 | Esque et al. .............. | 455/412.1 |
| 2006/0166655 A1* | 7/2006 | Montemer ............... | 455/414.1 |

* cited by examiner

*Primary Examiner*—David Q. Nguyen
(74) *Attorney, Agent, or Firm*—Zilka-Kotab, PC

(57) ABSTRACT

A system, method and computer program product are provided. While vocal communication is being provided with a second party, utilizing a cellular phone, an instruction is received by the cellular phone. In response to the instruction, data is transmitted to the second party, where the data include contact information.

10 Claims, 3 Drawing Sheets

SYSTEM, METHOD, AND COMPUTER PROGRAM PRODUCT FOR TRANSFERRING CONTACT INFORMATION USING A CELLULAR PHONE

This application claims the benefit of U.S. Provisional Application No. 60/620,239 filed on Oct. 18, 2004, the disclosure of which is incorporated herein by reference.

BACKGROUND AND FIELD OF THE INVENTION

The present invention relates to cellular communications, and more particularly to transferring data utilizing cell phone technology.

SUMMARY

A system, method and computer program product are provided. While vocal communication is being provided with a second party, utilizing a cellular phone, an instruction is received by the cellular phone. In response to the instruction, data is transmitted to the second party, where the data include contact information.

DETAILED DESCRIPTION

Figure 1:
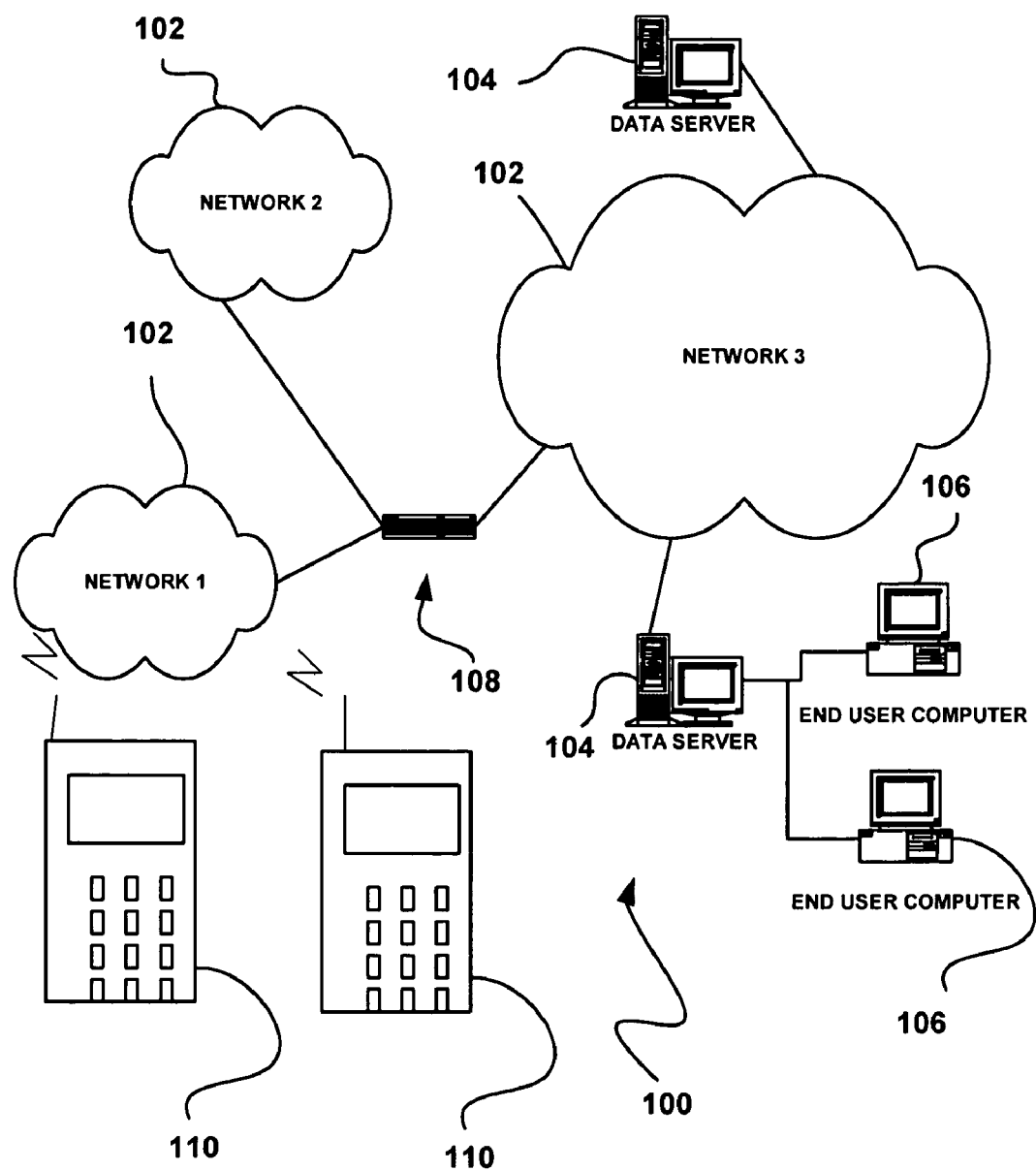
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, wireless networks (i.e. cellular, etc.), etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

Further shown are at least two cellular phones 110 capable of permitting voice communication utilizing cellular technology [i.e. Global System for Mobile (GSM), etc.]. For reasons that will soon become apparent, the cellular phones 110 are further adapted for data transmission. Such data transmission may be accomplished by any desired protocol (i.e. short message service, data over any other cellular protocols, etc.). Of course, the cellular phones 110 may take any form (i.e. palm computer, etc.), and be capable of any desired protocols (i.e. VoIP, etc.).

While not shown, the cellular phones 110 are further equipped with contact information (beyond mere cellular phone number). Such contact information may include, but is not limited to name, work and/or ground mail address, e-mail address, instant messaging address, hard-line phone number, etc.

Figure 2:
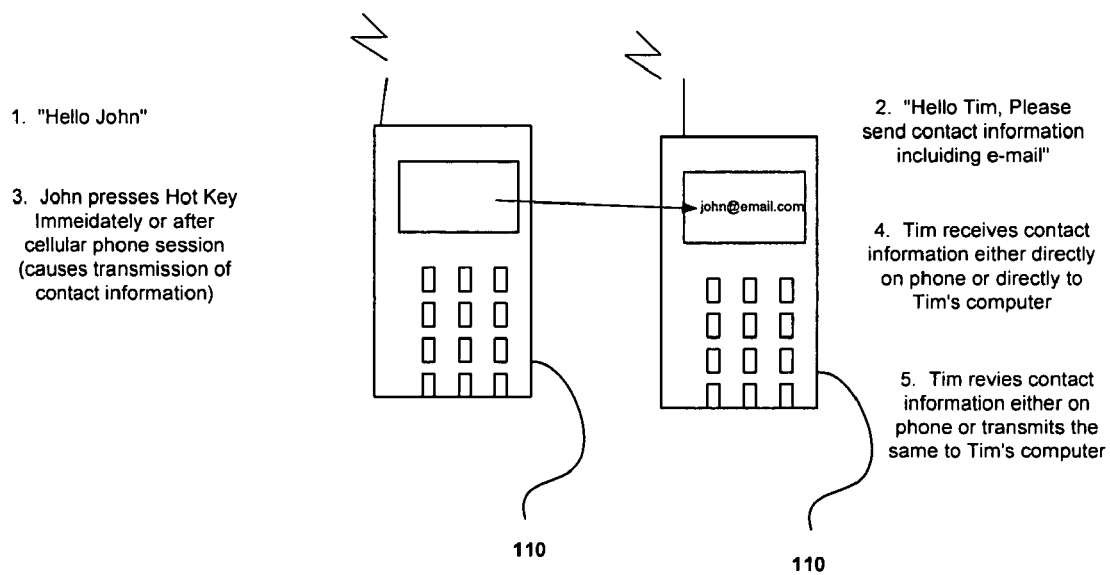
FIG. 2 shows an example of use of one embodiment.

FIG. 2 illustrates the manner in which the cellular phones 110 may be used to transmit contact information, in accordance with one embodiment. As shown, while vocal communication is being provided with a second party utilizing a cellular phone (i.e. cellular phone 100, etc.—see operations 1.-2.), an instruction is received by the cellular phone (note, for example, operation 3.)

It should be noted that the instruction may be received during or after the vocal communication. For example, the instruction may be received upon the depression of a hot key during the vocal communication, for a predetermined amount of time. In another example where the instruction is received after the vocal communication, the instruction may be received in response to a prompt provided by the cellular phone.

In response to the instruction, data is transmitted to the second party. As mentioned earlier, the contact information may include an electronic message address. Still yet, the contact information may include a name, mail address, and hard-line phone number.

With continuing reference to FIG. 2, after the receipt thereof on a phone of the second party, the contact information may be displayed or sent directly to a computer of the second party, for use by the second party. See operation 4.

As an option (see operation 5.), the contact information may be transmitted from a phone of the second party to a computer of the second party, upon the receipt of a second instruction. Such second instruction may be received in response to a prompt provided by the phone of the second party. In the present embodiment, the contact information may be stored in a contact database on the computer.

In a slightly varied embodiment, the contact information may be automatically transmitted from a phone of the second party to a computer of the second party.

Figure 3:
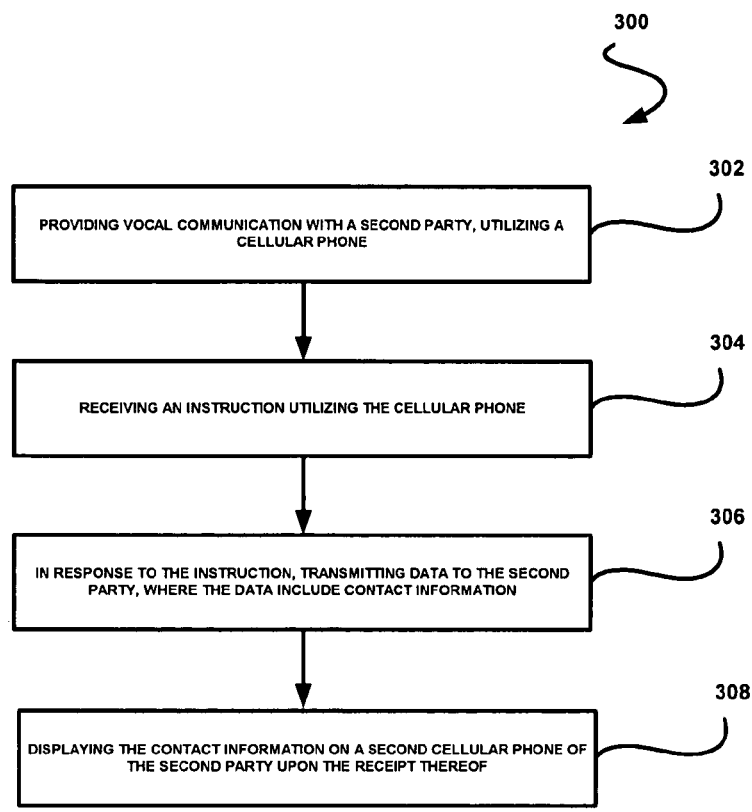
FIG. 3 illustrates a method for transmitting contact information using a cellular phone, in accordance with one embodiment.

FIG. 3 illustrates a method 300 for transmitting contact information utilizing a cellular phone, in accordance with another embodiment. As an option, the present method 300 may be implemented in the context of the architecture and environment of FIGS. 1 and/or 2. Of course, however, the method 300 may be carried out in any desired environment.

In operation 302, vocal communication is provided with a second party, utilizing a cellular phone. In operation 304, an instruction is received utilizing the cellular phone. In response to the instruction, in operation 306, data to the second party, where the data include contact information. Finally, as an option, the contact information is displayed on a second cellular phone of the second party upon the receipt thereof. Note operation 308.

As an option, the cellular phone may include software to allow a user to configure what, if any, contact information is sent. Moreover, different settings (and even hot keys) can be utilized to send different contact information to different second parties.

By this feature, a cellular phone user may easily provide other phone (e.g. cellular) users with contact information, without having to do so verbally, which often results in wrong phone numbers, e-mails, etc. being provided.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. An apparatus for providing communication between a first party and a second party, comprising:
   a cellular phone of the second party operable to provide vocal communication between the first party and the second party, the cellular phone including:
      a user interface operable to receive a first instruction during the vocal communication upon a depression of a hot key during the vocal communication, for a predetermined amount of time,
      communication hardware operable to be responsive to the first instruction and generate a data message capable of including first contact information for being transmitted to the first party, the communication hardware further operable to receive second contact information from the first party, and
      a display operable to display the received second contact information;
   wherein the received second contact information is transmitted from the cellular phone of the second party to a computer of the second party, upon a receipt of a second instruction;
   wherein the cellular phone is operable to provide the vocal communication utilizing a VoIP protocol.

2. The apparatus as recited in claim 1, wherein the user interface is operable to output a prompt and receive the first instruction, in response to the prompt.

3. The apparatus as recited in claim 1, wherein the user interface is operable to output a prompt and receive the second instruction, in response to the prompt.

4. The apparatus as recited in claim 1, wherein the received second contact information includes a name, a work ground mail address, an e-mail address, an instant messaging address, and a hard-line phone number.

5. The apparatus as recited in claim 1, wherein the received second contact information is automatically transmitted from the cellular phone of the second party to the computer of the second party.

6. The apparatus as recited in claim 1, wherein the communication hardware is operable to transmit the first contact information during the vocal communication.

7. The apparatus as recited in claim 1, wherein the cellular phone includes a palm computer.

8. The apparatus as recited in claim 1, wherein the communication hardware is operable to transmit the first contact information to the first party utilizing a messaging service protocol, and receive the second contact information from the first party utilizing the messaging service protocol.

9. The apparatus as recited in claim 8, wherein the messaging service protocol includes a short message service protocol.

10. The apparatus as recited in claim 1, wherein the user interface is operable to output a first prompt and receive the first instruction, in response to the first prompt; the user interface further operable to output a second prompt and receive the second instruction, in response to the second prompt; wherein the received second contact information includes a name, a work ground mail address, an e-mail address, an instant messaging address, and a hard-line phone number; wherein the communication hardware is operable to transmit the first contact information to the first party utilizing a cellular phone messaging service protocol, and receive the second contact information from the first party utilizing the cellular phone messaging service protocol; wherein the communication hardware is capable of transmitting different contact information to different parties.

* * * * *